United States Patent
Oh et al.

(10) Patent No.: US 8,475,049 B2
(45) Date of Patent: Jul. 2, 2013

(54) FLUID DYNAMIC BEARING ASSEMBLY

(75) Inventors: Sang Yong Oh, Gyunggi-do (KR); Sang Jin Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/137,222

(22) Filed: Jul. 28, 2011

(65) Prior Publication Data

US 2012/0033905 A1 Feb. 9, 2012

(30) Foreign Application Priority Data

Aug. 5, 2010 (KR) .......................... 10-2010-0075724

(51) Int. Cl.
 *F16C 32/06* (2006.01)
(52) U.S. Cl.
 USPC .............................. 384/114; 384/115; 384/123
(58) Field of Classification Search
 USPC .................. 384/100, 107, 114–115, 120, 123
 See application file for complete search history.

(56) References Cited

U.S. PATENT DOCUMENTS

| | | | | |
|---|---|---|---|---|
| 4,726,693 A | * | 2/1988 | Anderson et al. | 384/114 |
| 5,707,154 A | * | 1/1998 | Ichiyama | 384/120 |
| 5,715,116 A | * | 2/1998 | Moritan et al. | 384/115 |
| 5,810,480 A | * | 9/1998 | Asada et al. | 384/107 |
| 6,196,722 B1 | * | 3/2001 | Asada et al. | 384/107 |
| 6,271,612 B1 | * | 8/2001 | Tanaka et al. | 384/107 |
| 6,760,187 B2 | * | 7/2004 | Asada et al. | 360/99.08 |
| 6,905,247 B2 | * | 6/2005 | Kishi | 384/120 |
| 7,077,572 B2 | * | 7/2006 | Horng et al. | 384/114 |
| 2008/0240633 A1 | * | 10/2008 | Uenosono | 384/107 |
| 2010/0148606 A1 | * | 6/2010 | Yu et al. | 384/112 |

FOREIGN PATENT DOCUMENTS

| | | | | |
|---|---|---|---|---|
| JP | 10309061 | A | * | 11/1998 |
| JP | 2002130257 | A | * | 5/2002 |
| JP | 2002195252 | A | * | 7/2002 |
| JP | 2004-108509 | | | 4/2004 |

* cited by examiner

*Primary Examiner* — Marcus Charles

(57) ABSTRACT

There is provided a fluid dynamic bearing assembly including: a sleeve having a shaft insertedly mounted therein; and upper and lower radial bearing parts formed on at least one of an outer circumferential surface of the shaft and an inner circumferential surface of the sleeve, wherein a clearance between the lower radial bearing part and a surface disposed to face the lower radial bearing part is wider than a clearance between the upper radial bearing part and a surface disposed to face the upper radial bearing part.

7 Claims, 4 Drawing Sheets

FLUID DYNAMIC BEARING ASSEMBLY

CROSS-REFERENCE TO RELATED APPLICATIONS

This application claims the priority of Korean Patent Application No. 10-2010-0075724 filed on Aug. 5, 2010, in the Korean Intellectual Property Office, the disclosure of which is incorporated herein by reference.

BACKGROUND OF THE INVENTION

1. Field of the Invention

The present invention relates to a fluid dynamic bearing assembly, and more particularly, to a fluid dynamic bearing assembly included in a motor to thereby generate dynamic pressure.

2. Description of the Related Art

A small spindle motor used in a hard disk drive (HDD) is generally provided with a fluid dynamic bearing assembly, and a bearing clearance formed between a shaft and a sleeve of the fluid dynamic bearing assembly is filled with a lubricating fluid such as oil. The oil filling the bearing clearance generates fluid dynamic pressure while being compressed, thereby rotatably supporting the shaft.

That is, the fluid dynamic bearing assembly generally generates dynamic pressure through spiral shaped grooves in an axial direction and herringbone shaped grooves in a circumferential direction, thereby promoting stability in the rotational driving of the spindle motor.

Meanwhile, in accordance with the recent increase in capacity of hard disk drives, a technical problem in which vibrations generated during the driving of the spindle motor should be reduced has been caused. That is, in order to allow the hard disk drive to be driven without an error due to vibrations generated during the driving of the spindle motor, the demand for an improvement in the performance of the fluid dynamic bearing assembly included in the spindle motor has been increased.

In addition, in order to improve the performance of the fluid dynamic bearing assembly, there is a need to increase an interval (that is, a length of a bearing span) between the herringbone shaped grooves to move a rotating center upwardly, thereby reducing vibrations generated during the driving of the spindle motor.

However, there is a limitation in increasing the interval (that is, the length of the bearing span) between the herringbone shaped grooves. In other words, there is a limitation in increasing the length of the bearing span without increasing a height of the hard disk drive (in a state in which the hard disk drive has a constant height of 2.5 inches).

SUMMARY OF THE INVENTION

An aspect of the present invention provides a fluid dynamic bearing assembly capable of reducing vibrations generated during the driving thereof.

According to an aspect of the present invention, there is provided a fluid dynamic bearing assembly including: a sleeve having a shaft insertedly mounted therein; and upper and lower radial bearing parts formed on at least one of an outer circumferential surface of the shaft and an inner circumferential surface of the sleeve, wherein a clearance between the lower radial bearing part and a surface disposed to face the lower radial bearing part is wider than a clearance between the upper radial bearing part and a surface disposed to face the upper radial bearing part.

A ratio of the clearance between the upper radial bearing part and the surface disposed to face the upper radial bearing part to the clearance between the lower radial bearing part and the surface disposed to face the lower radial bearing part may be in a range of 1:1.1 to 1.5.

The upper radial bearing part may have an axial length longer than that of the lower radial bearing part.

A ratio of the axial length of the lower radial bearing part to the axial length of the upper radial bearing part may be 1:1.2 or less yet larger than 1:1.

The sleeve may include an extension part disposed between the upper and lower radial bearing parts.

The upper and lower radial bearing parts maybe formed on the inner circumferential surface of the sleeve, and the inner circumferential surface of the sleeve may be stepped in an axial direction so that a clearance between the lower radial bearing part and the shaft maybe wider than a clearance between the upper radial bearing part and the shaft.

The upper and lower radial bearing parts maybe formed on the inner circumferential surface of the sleeve, and the shaft may include a diameter reducing part formed at a lower end thereof so that a clearance between the lower radial bearing part and the shaft may be wider than a clearance between the upper radial bearing part and the shaft.

The sleeve may include a circulating hole formed therein, the circulating hole being capable of circulating lubricating fluid disposed between the sleeve and the shaft.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Moreover, detailed descriptions related to well-known functions or configurations will be ruled out in order not to unnecessarily obscure subject matters of the present invention.

Figure 1:
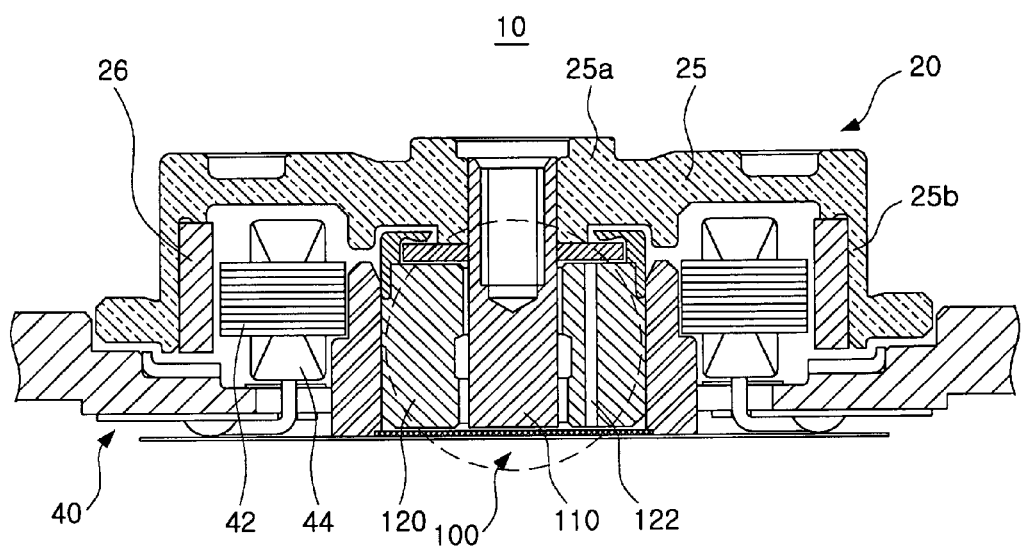
FIG. 1 is a cross-sectional view schematically showing a motor including a fluid dynamic bearing assembly according to a first exemplary embodiment of the present invention.
Figure 2:
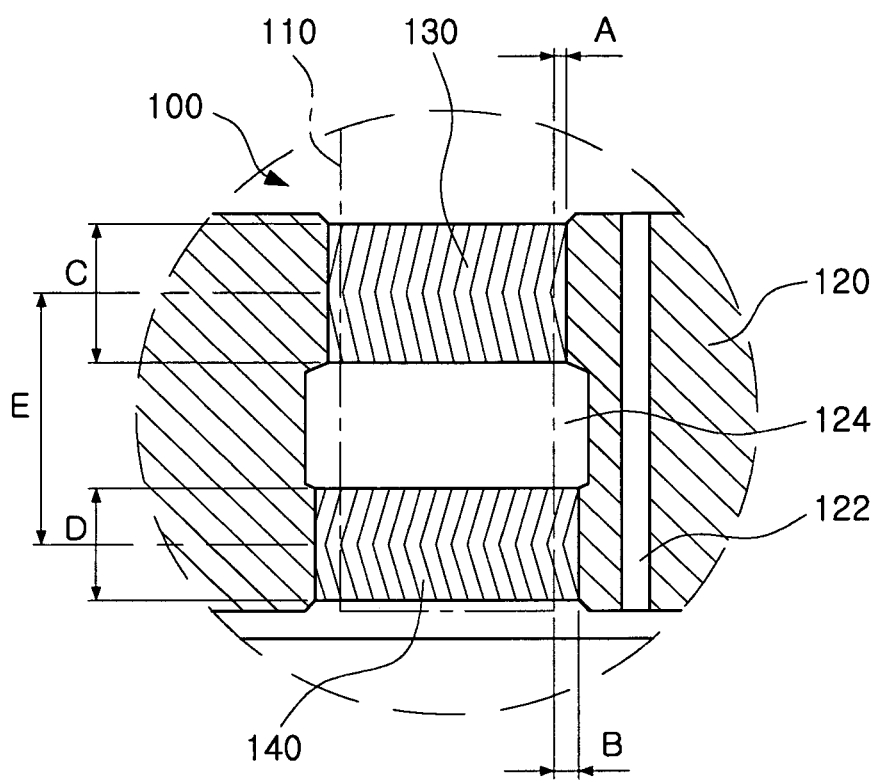
FIG. 2 is a cross-sectional view schematically showing the fluid dynamic bearing assembly according to the first exemplary embodiment of the present invention.

FIG. 1 is a cross-sectional view schematically showing a motor including a fluid dynamic bearing assembly according to a first exemplary embodiment of the present invention; and FIG. 2 is a cross-sectional view schematically showing the fluid dynamic bearing assembly according to the first exemplary embodiment of the present invention.

Referring to FIGS. 1 and 2, a fluid dynamic bearing assembly 100 includes a shaft 110, a sleeve 120, an upper radial bearing part 130, and a lower radial bearing part 140.

Meanwhile, a motor 10 having the fluid dynamic bearing assembly 100 mounted therein, which is a motor applied to a hard disk drive rotating a hard disk, is configured of a rotor 20 and a stator 40.

The rotor 20 includes an inverted cup shaped rotor case 25 including an annular ring shaped magnet 26 formed on an inner circumferential surface thereof, wherein the annular ring shaped magnet 26 corresponds to a stator core 42. The annular ring shaped magnet 26 is a permanent magnet generating magnetic force having a predetermined strength by alternately magnetizing an N pole and an S pole thereof in a circumferential direction.

In addition, the rotor case 25 may include a rotor hub 25a having the shaft 30 insertedly connected thereto and a magnet coupling part 25b having the annular ring shaped magnet 26 disposed on an inner surface thereof.

The stator 40, which refers to all fixed members with the exception of rotating members, includes the stator core 42 and a winding coil 44 wound around the stator core 42.

Meanwhile, the magnet 26 provided on an inner circumferential surface of the magnet coupling part 25b is disposed to face the winding coil 44, the rotor 20 being rotated by electromagnetic interaction between the magnet 26 and the winding coil 44. In other words, when the rotor case 25 rotates, the shaft 30, interconnected with the rotor case 25, rotates.

First, terms with regard to directions will be defined. An axial direction refers to a vertical direction based an the shaft 110, a radial direction refers to an outer edge direction of the rotor 20 based on the shaft 110 or a central direction of the shaft 110 based on the outer edge of the rotor 20, and a circumferential direction refers to a direction rotating around an outer circumferential surface of the shaft 110, when viewed in FIG. 1.

The sleeve 120 has the shaft 110 insertedly mounted therein. Meanwhile, the sleeve 120 may be formed by forging Cu or Al or sintering a Cu—Fe-based alloy powder or an SUS-based powder, and may be formed to have an unvarying outer diameter in an axial direction. Therefore, the sleeve 120 may be manufactured in a single mold.

In addition, the sleeve 120 may have a hollow cylindrical shape so that the shaft 110 may be insertedly mounted therein. Further, an inner circumferential surface of the sleeve 120 and the shaft 110 has a bearing clearance formed therebetween, wherein the bearing clearance is filled with lubricating fluid. Therefore, the lubricating fluid filling the bearing clearance generates fluid dynamic pressure while being compressed during the rotation of the shaft 110, thereby rotatably supporting the shaft 110.

Meanwhile, the sleeve 120 may include a circulating hole 122 formed therein, wherein the circulating hole 122 provides a movement path for the lubricating fluid in an axial direction so that the lubricating fluid filled in the bearing clearance may be circulated. The lubricating fluid filled between the inner circumferential surface of the sleeve 120 and the shaft 110 moves through the circulating hole 122, such that it may flow in a counterclockwise direction.

In addition, the inner circumferential surface of the sleeve 120 may be formed to have a step, a detailed description of which will be provided below.

The upper and lower radial bearing parts 130 and 140 may be formed on at least one of the outer circumferential surface of the shaft 110 and the inner circumferential surface of the sleeve 120.

Meanwhile, in the present embodiment, a case in which the upper and lower radial bearing parts 130 and 140 are formed on the inner circumferential surface of the sleeve 120 will be described.

The upper radial bearing part 130 is formed at an upper portion of the inner circumferential surface of the sleeve 120 facing the outer circumferential surface of the shaft 110. That is, the upper radial bearing part 130 may be configured of a dynamic pressure groove formed at the upper portion of the sleeve 120 and be formed along the inner circumferential surface of the sleeve 120 in the circumferential direction.

Meanwhile, the upper radial bearing part 130 may be configured of, for example, a dynamic pressure groove having a herringbone shape.

The lower radial bearing part 140 is formed at a lower portion of the inner circumferential surface of the sleeve 120 facing the outer circumferential surface of the shaft 110. That is, the lower radial bearing part 140 is formed in the inner circumferential surface of the sleeve 120 and is disposed to be spaced apart from the upper radial bearing part 130 by a predetermined interval.

In addition, the lower radial bearing part 140 may be configured of a dynamic pressure groove formed in the inner circumferential surface of the sleeve 120 and be formed along the inner circumferential surface of the sleeve 120 in the circumferential direction, similar to the upper radial bearing part 130. In addition, the lower radial bearing part 140 may be configured of, for example, a dynamic pressure groove having a herringbone shape.

Meanwhile, a clearance B between the lower radial bearing part 140 and the shaft 110 is formed to be wider than a clearance A between the upper radial bearing part 130 and the shaft 110.

A detailed description thereof will be provided hereinafter. The sleeve 120 may have the upper radial bearing part 130 and the lower radial bearing part 140 formed in the inner circumferential surface thereof and an extension part 124 formed between the upper radial bearing part 130 and the lower radial bearing part 140.

In addition, the sleeve 120 is formed to have a stepped inner diameter. That is, the sleeve 120 has the smallest inner diameter at the upper portion thereof at which the upper radial bearing part 130 is formed, and has the largest inner diameter at the extension part 124 thereof. In addition, an inner diameter at the lower portion of the sleeve at which the lower radial bearing part 140 is formed is larger than that at the upper portion thereof at which the upper radial bearing part 130 is formed, and is smaller than that at the extension part 124.

Therefore, the clearance B between the lower radial bearing part 140 and the shaft 110 is formed to be wider than the clearance A between the upper radial bearing part 130 and the shaft 110. Accordingly, pressure applied from the upper radial bearing part 130 to the lubricating fluid becomes larger than that applied from the lower radial bearing part 140 to the lubricating fluid.

Meanwhile, since a difference in pressure is generated due to a difference between the clearance between the upper radial bearing part 130 and the shaft 110 and the clearance between the lower radial bearing part 140 and the shaft 110 as described above, an interval between the upper radial bearing part 130 and the lower radial bearing part 140, that is, a length of a bearing span E may be increased while an axial length C of the upper radial bearing part 140 is reduced. That is, a height of the extension part 124 of the sleeve 120, in other words, an axial length of the extension part 124 may be increased.

Therefore, a rotating center of the rotor 20 moves upwardly, such that vibrations generated during the driving of the motor 10 may be reduced, whereby the stability of the rotational driving of the motor 10 may be improved.

In addition, the axial length C of the upper radial bearing part 130 is reduced, such that a frictional area between the upper radial bearing part 130 and the lubricating fluid may be reduced, whereby frictional force during the driving of the motor 10 may be reduced.

Further, a ratio of the clearance A between the upper radial bearing part 130 and the shaft 110 to the clearance B between the lower radial bearing part 140 and the shaft 110 may be 1:1.1 or more. Further, the ratio of the clearance A between the upper radial bearing part 130 and the shaft 110 to the clearance B between the lower radial bearing part 140 and the shaft 110 may be in a range of 1:1.1 to 1.5.

That is, when the ratio of the clearance A between the upper radial bearing part 130 and the shaft 110 to the clearance B between the lower radial bearing part 140 and the shaft 110 is excessively large, the generation of vibrations during the driving of the motor may be increased. In other words, since the pressure pressing the lubricating fluid becomes excessively low, such that the shaft 110 may rotate while being eccentric based on the lower radial bearing part 140, the generation of vibrations during the driving of the motor increases.

Meanwhile, the upper radial bearing part 130 may be formed to have the axial length C longer than an axial length D of the lower radial bearing part 140. Therefore, the pressure applied to the lubricating fluid by the upper radial bearing part 130 becomes larger than that applied to the lubricating fluid by the lower radial bearing part 140.

Accordingly, the lubricating fluid may flow from the upper radial bearing part 130 to the lower radial bearing part 140 and be then circulated through the circulating hole 122 of the sleeve 120 in a counterclockwise direction.

Meanwhile, a ratio of the axial length D of the lower radial bearing part 140 to the axial length C of the upper radial bearing part 130 is 1:1.2 or less yet larger than 1:1.

Therefore, the pressure applied from the upper radial bearing part 130 may be larger than that applied from the lower radial bearing part 140.

As described above, the clearance B between the lower radial bearing part 140 and the shaft 110 is formed to be wider than the clearance A between the upper radial bearing part 130 and the shaft 110, whereby the axial length of the extension part 124 may be increased by reducing the axial length C of the upper radial bearing part 130. Therefore, vibrations generated during the driving of the motor are reduced, whereby the stability of the rotational driving of the motor 10 may be improved.

That is, the length of the bearing span E may be increased, such that a rotating center may move upwardly. Therefore, vibrations generated during the driving of the motor may be reduced, whereby the stability of the rotational driving of the motor 10 may be improved.

In addition, the axial length C of the upper radial bearing part 130 may be reduced, such that a frictional area between the upper radial bearing part 130 and the lubricating fluid is reduced, whereby the amount of current consumed during the driving of the motor may be reduced.

Meanwhile, although the present embodiment describes a case in which the upper and lower radial bearing parts 130 and 140 are formed on the inner circumferential surface of the sleeve 120, the present invention is not limited thereto. The upper and lower radial bearing parts 130 and 140 may also be formed on the outer circumferential surface of the shaft 110.

FIGS. 1 and 2 are exaggerated views clearly showing technical characteristics of the present invention.

Hereinafter, a fluid dynamic bearing assembly according to a second exemplary embodiment of the present invention will be described with reference to FIGS. 3 and 4. However, a detail description of the same components as those described in the above-mentioned embodiment will be omitted.

Figure 3:
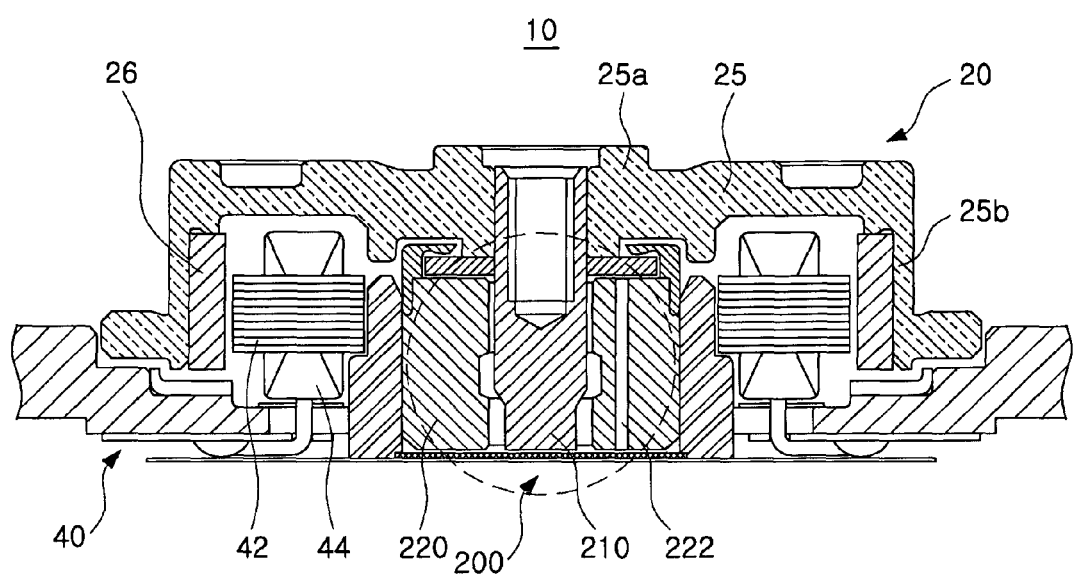
FIG. 3 is a cross-sectional view schematically showing a motor including a fluid dynamic bearing assembly according to a second exemplary embodiment of the present invention.
Figure 4:
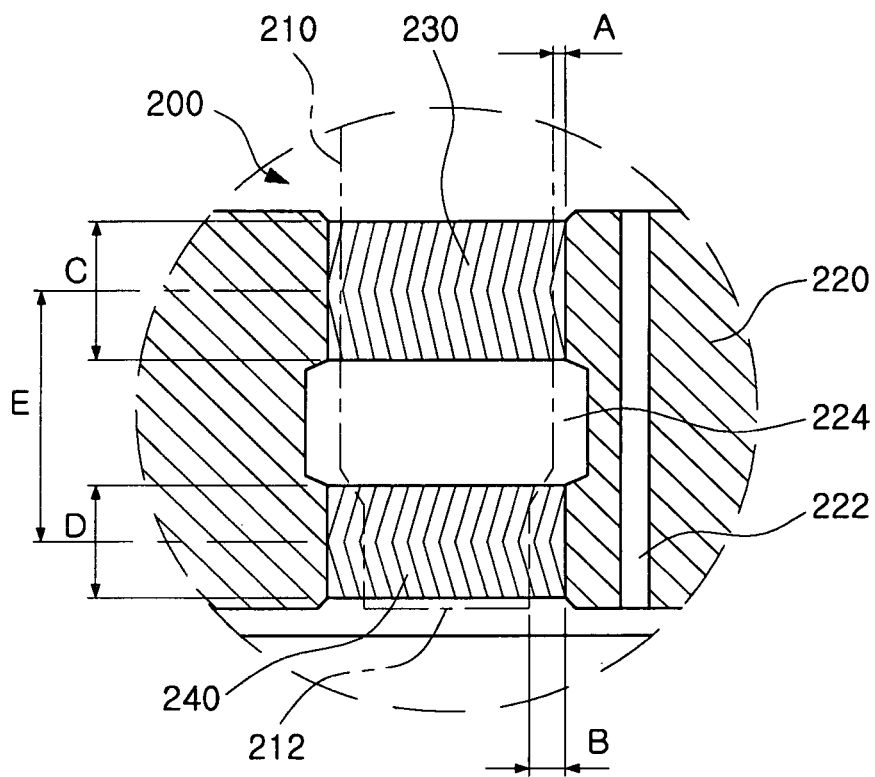
FIG. 4 is a cross-sectional view schematically showing the fluid dynamic bearing assembly according to the second exemplary embodiment of the present invention.

FIG. 3 is a cross-sectional view schematically showing a motor including a fluid dynamic bearing assembly according to a second exemplary embodiment of the present invention; and FIG. 4 is a cross-sectional view schematically showing the fluid dynamic bearing assembly according to the second exemplary embodiment of the present invention.

Referring to FIGS. 3 and 4, a fluid dynamic bearing assembly 200 according to the second exemplary embodiment of the present invention includes a shaft 210, a sleeve 220, an upper radial bearing part 230, and a lower radial bearing part 240.

The sleeve 220 has the shaft 210 insertedly mounted therein. The shaft 210 may include a diameter reducing part 212 formed at a lower end thereof, wherein the diameter reducing part 212 expands a clearance B between the shaft 210 and the lower radial bearing part 240.

In addition, the sleeve 220 may have a hollow cylindrical shape so that the shaft 210 may be insertedly mounted therein. Further, an inner circumferential surface of the sleeve 220 and the shaft 210 has a bearing clearance formed therebetween, wherein the bearing clearance is filled with lubricating fluid. Therefore, the lubricating fluid generates fluid dynamic pressure while being compressed during the rotation of the shaft 210, thereby rotatably supporting the shaft 210.

Meanwhile, the sleeve 220 may include a circulating hole 222 formed therein, wherein the circulating hole 222 provides a movement path for the lubricating fluid in an axial direction so that the lubricating fluid filled in the bearing clearance may be circulated. The lubricating fluid filled between the inner circumferential surface of the sleeve 220 and the shaft 210 moves through the circulating hole 222, such that it may flow in a counterclockwise direction.

The upper radial bearing part 230 is formed at an upper portion of the inner circumferential surface of the sleeve 220 facing the outer circumferential surface of the shaft 210. That is, the upper radial bearing part 230 may be configured of a dynamic pressure groove formed at the upper portion of the sleeve 220 and formed along the inner circumferential surface of the sleeve 220 in the circumferential direction.

Meanwhile, the upper radial bearing part 230 may be configured of, for example, a dynamic pressure groove having a herringbone shape.

The lower radial bearing part 240 is formed at a lower portion of the inner circumferential surface of the sleeve 220 facing the outer circumferential surface of the shaft 210. That is, the lower radial bearing part 240 is formed in the inner circumferential surface of the sleeve 220 and is disposed to be spaced apart from the upper radial bearing part 230 by a predetermined interval.

In addition, the lower radial bearing part 240 may be configured of a dynamic pressure groove formed in the inner circumferential surface of the sleeve 220 and be formed along the inner circumferential surface of the sleeve 220 in the circumferential direction, similar to the upper radial bearing part 230. In addition, the lower radial bearing part 240 may be configured of, for example, a dynamic pressure groove having a herringbone shape.

Meanwhile, a clearance B between the lower radial bearing part 240 and the shaft 210 is formed to be wider than a clearance A between the upper radial bearing part 230 and the shaft 210.

A detailed description thereof will be provided below. The shaft 210 includes the diameter reducing part 212 formed at the lower end thereof. The sleeve 220 may be formed to have an unvarying inner circumference surface in an axial direction. That is, the sleeve 220 is formed to have a cylindar shape in which it has a constant inner diameter without a change in a diameter.

That is, the shaft 210 includes the diameter reducing part 212 formed at the lower end thereof, such that the clearance A between the upper radial bearing part 230 and the shaft 210 is formed to be narrower than the clearance B between the lower radial bearing part 240 and the shaft 210.

As a result, pressure applied from the upper radial bearing part 230 to the lubricating fluid becomes larger than that applied from the lower radial bearing part 240 to the lubricating fluid.

Since a difference in the pressure is generated due to a difference between the clearance between the upper radial bearing part 230 and the shaft 210 and the clearance between the lower radial bearing part 240 and the shaft 210 as described above, an interval between the upper radial bearing part 230 and the lower radial bearing part 240, that is, a length of a bearing span E may be increased while an axial length C of the upper radial bearing part 230 is reduced. That is, a height of the extension part 224 of the sleeve 220, in other words, an axial length of the extension part 224 may be increased.

Therefore, a rotating center of the rotor 20 moves upwardly, such that vibrations generated during the driving of the motor 10 may be reduced, whereby the stability of the rotational driving of the motor 10 may be improved.

In addition, the axial length C of the upper radial bearing part 230 is reduced, such that a frictional area between the upper radial bearing part 230 and the lubricating fluid may be reduced, whereby frictional force may be reduced during the driving of the motor 10.

Further, a ratio of the clearance A between the upper radial bearing part 230 and the shaft 210 to the clearance B between the lower radial bearing part 240 and the shaft 210 may be 1:1.1 or more. Further, the ratio of the clearance A between the upper radial bearing part 230 and the shaft 210 to the clearance B between the lower radial bearing part 240 and the shaft 210 may be in a range of 1:1.1 to 1.5.

That is, in the case that the ratio of the clearance A between the upper radial bearing part 230 and the shaft 210 to the clearance B between the lower radial bearing part 240 and the shaft 210 is excessively large, the generation of vibrations during the driving of the motor may be increased. In other words, since the pressure pressing the lubricating fluid becomes excessively low, such that the shaft 210 may rotate while being eccentric based on the lower radial bearing part 240, the generation of vibrations during the driving of the motor increases.

Meanwhile, the upper radial bearing part 230 may be formed to have the axial length C longer than an axial length D of the lower radial bearing part 240. Therefore, the pressure applied to the lubricating fluid by the upper radial bearing part 230 becomes larger than that applied to the lubricating fluid by the lower radial bearing part 240.

Accordingly, the lubricating fluid may flow from the upper radial bearing part 230 to the lower radial bearing part 240 and be then circulated through the circulating hole 222 of the sleeve 220 in a counterclockwise direction.

Meanwhile, a ratio of the axial length D of the lower radial bearing part 240 to the axial length C of the upper radial bearing part 230 is 1:1.2 or less yet larger than 1:1.

Therefore, the pressure applied from the upper radial bearing part 230 may be larger than that applied from the lower radial bearing part 240.

As described above, the clearance B between the lower radial bearing part 240 and the shaft 210 is formed to be wider than the clearance A between the upper radial bearing part 230 and the shaft 210, whereby the axial length of the extension part 224 may be increased by reducing the axial length C of the upper radial bearing part 230. Therefore, vibrations generated during the driving of the motor are reduced, whereby the stability of the rotational driving of the motor 10 may be improved.

That is, the length of the bearing span E may be increased, such that a rotating center may move upwardly. Therefore, vibrations generated during the driving of the motor may be reduced, whereby the stability of the rotational driving of the motor 10 may be improved.

In addition, the axial length C of the upper radial bearing part 230 may be reduced, such that a frictional area between the upper radial bearing part 230 and the lubricating fluid is reduced, whereby the amount of current consumed during the driving of the motor may be reduced.

Meanwhile, although the present embodiment describes a case in which the upper and lower radial bearing parts 230 and 240 are formed on the inner circumferential surface of the sleeve 220, the present invention is not limited thereto. The upper and lower radial bearing parts 230 and 240 may also be formed on the outer circumferential surface of the shaft 210.

In addition, FIGS. 3 and 4 are exaggerated views clearly showing technical characteristics of the present invention. Therefore, there is a difference between the views of FIGS. 3 and 4 and actual views.

As set forth above, according to the exemplary embodiments of the present invention, a clearance between a lower radial bearing part and a surface disposed to face the lower radial bearing part is formed to be wider than that between an upper radial bearing part and a surface disposed to face the upper radial bearing part, whereby a length of a bearing span may be increased by reducing an axial length of the upper radial bearing part.

Therefore, a rotating center may move upwardly in an axial direction of the shaft, such that the generation of vibrations during the rotational driving of a motor may be reduced, whereby the stability of the rotational driving of the motor may be improved.

In addition, the axial length of the upper radial bearing part is reduced, such that a contact area between the upper radial bearing part and lubricating fluid is reduced, whereby frictional force may be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A fluid dynamic bearing assembly comprising:
a sleeve having a shaft insertedly mounted therein; and
upper and lower radial bearing parts formed on at least an inner circumferential surface of the sleeve, wherein a clearance between the lower radial bearing part and a surface of the shaft disposed to face the lower radial bearing part is wider than a clearance between the upper radial bearing part and a surface of the shaft disposed to face the upper radial bearing part, and the inner circumferential surface of the sleeve is stepped in an axial direction so that a clearance between the lower radial bearing part and the shaft is wider than a clearance between the upper radial bearing part and the shaft.

2. The fluid dynamic bearing assembly of claim 1, wherein a ratio of the clearance between the upper radial bearing part and the surface disposed to face the upper radial bearing part to the clearance between the lower radial bearing part and the surface disposed to face the lower radial bearing part is in a range of 1:1.1 to 1.5.

3. The fluid dynamic bearing assembly of claim 1, wherein the upper radial bearing part has an axial length longer than that of the lower radial bearing part.

4. The fluid dynamic bearing assembly of claim 3, wherein a ratio of the axial length of the lower radial bearing part to the axial length of the upper radial bearing part is 1:1.2 or less yet larger than 1:1.

5. The fluid dynamic bearing assembly of claim 1, wherein the sleeve includes an extension part disposed between the upper and lower radial bearing parts.

6. The fluid dynamic bearing assembly of claim 1, wherein the sleeve includes a circulating hole formed therein, the circulating hole being capable of circulating lubricating fluid disposed between the sleeve and the shaft.

7. A fluid dynamic bearing assembly comprising:
a sleeve having a shaft insertedly mounted therein; and
upper and lower radial bearing parts formed on at least an inner circumferential surface of the sleeve,
wherein a clearance between the lower radial bearing part and a surface of the shaft disposed to face the lower radial bearing part is wider than a clearance between the upper radial bearing part and a surface of the shaft disposed to face the upper radial bearing part, and
the shaft includes a diameter reducing part formed at a lower end thereof so that a clearance between the lower radial bearing part and the shaft is wider than a clearance between the upper radial bearing part and the shaft.

* * * * *